US012729807B2

(12) United States Patent
Yang et al.

(10) Patent No.: US 12,729,807 B2
(45) Date of Patent: Sep. 8, 2026

(54) BRACKET ASSEMBLY

(71) Applicant: WISTRON NEWEB CORPORATION, Hsinchu (TW)

(72) Inventors: Lan-Chun Yang, Hsinchu (TW); Chun-Wei Wang, Hsinchu (TW); Yu-Liang Weng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 24 days.

(21) Appl. No.: 19/007,678

(22) Filed: Jan. 2, 2025

(65) Prior Publication Data

US 2026/0043516 A1 Feb. 12, 2026

(30) Foreign Application Priority Data

Aug. 6, 2024 (TW) ................................ 113129293

(51) Int. Cl.
*H01Q 1/12* (2006.01)
*F16M 13/02* (2006.01)

(52) U.S. Cl.
CPC ............. *F16M 13/02* (2013.01); *H01Q 1/12* (2013.01); *F16M 2200/021* (2013.01); *F16M 2200/06* (2013.01)

(58) Field of Classification Search
CPC ......... F16M 2200/021; F16M 2200/06; F16M 13/022; A47G 29/02; H01Q 1/125; H01Q 1/1228; H01Q 1/1221; H01Q 3/06; H01Q 3/02
USPC ........ 248/291, 242, 241, 397, 235; 108/6, 1; 211/99, 100
See application file for complete search history.

(56) References Cited

U.S. PATENT DOCUMENTS 479,424 A * 7/1892 Huff et al. ........... A47B 96/061 248/225.11
485,589 A * 11/1892 Ravenel, Jr. et al. ........................ A47B 57/045 16/346
945,428 A * 1/1910 Wendt .................. A47B 96/061 248/235
3,561,713 A * 2/1971 Berkowitz ........... A47B 57/045 211/100
3,746,144 A * 7/1973 Englert .................. B65G 37/00 198/592
4,049,948 A * 9/1977 Gilreath ................... H05B 3/06 219/403
5,195,900 A * 3/1993 Kumagai ........... H01R 13/6215 248/185.1

(Continued)

*Primary Examiner* — Nkeisha Smith
(74) *Attorney, Agent, or Firm* — McClure, Qualey & Rodack, LLP

(57) ABSTRACT

A bracket assembly includes a first bracket and a second bracket. The first bracket includes a mounting base and two side connecting plates. The two side connecting plates are connected to both sides of the mounting base, respectively. The mounting base has a mounting surface, and the mounting surface has a cross-shaped groove. The second bracket is pivotally connected to the first bracket, and the second bracket is located on the opposite side of the mounting surface. The second bracket includes a supporting base, an extension portion, and two wing portions. The extension portion is connected to one side of the supporting base, and the two wing portions are connected to the extension portion and extend in a same direction. The extension portion forms a first limiting gap between the two wing portions.

10 Claims, 10 Drawing Sheets

(56) References Cited

U.S. PATENT DOCUMENTS

| | | | | | |
|---|---|---|---|---|---|
| 5,423,506 | A * | 6/1995 | Spoon | B60P 3/343 | 160/67 |
| 5,603,682 | A * | 2/1997 | Grider | A47C 7/40 | 482/142 |
| 5,926,151 | A * | 7/1999 | Hagiwara | H01Q 1/125 | 343/890 |
| 5,969,692 | A * | 10/1999 | Ishizuka | H01Q 1/125 | 343/765 |
| 6,031,508 | A * | 2/2000 | Ishizuka | H01Q 1/125 | 343/882 |
| 6,262,691 | B1 * | 7/2001 | Austin | H01Q 1/1228 | 343/890 |
| 6,664,937 | B2 * | 12/2003 | Vermette | H01Q 1/1228 | 343/882 |
| 7,546,993 | B1 * | 6/2009 | Walker | F16M 11/24 | 248/229.12 |
| 7,798,461 | B2 * | 9/2010 | Hackney | E04B 7/045 | 248/397 |
| 7,954,777 | B2 * | 6/2011 | Bohm | H01Q 1/1221 | 403/57 |
| 8,020,824 | B2 * | 9/2011 | Pan | H01Q 1/1242 | 248/222.51 |
| 8,339,329 | B2 * | 12/2012 | Shen | H01Q 1/125 | 343/882 |
| 8,760,361 | B2 * | 6/2014 | Lewry | H01Q 1/125 | 343/912 |
| 8,794,578 | B2 * | 8/2014 | Lin | H01Q 1/125 | 343/890 |
| 9,966,649 | B2 * | 5/2018 | Christie | H01Q 3/06 | |
| 10,340,579 | B2 * | 7/2019 | Tsukada | H01Q 1/125 | |
| 11,038,253 | B1 * | 6/2021 | Tseng | H01Q 1/288 | |
| 11,909,094 | B2 * | 2/2024 | Yoo | H01Q 1/246 | |
| 12,294,136 | B2 * | 5/2025 | Kim | H01Q 1/1242 | |
| 12,474,013 | B2 * | 11/2025 | Yang | F16M 11/10 | |
| 12,492,780 | B1 * | 12/2025 | Chu | F16M 11/041 | |
| 12,548,882 | B2 * | 2/2026 | Isambard | H01Q 1/125 | |
| 2005/0264467 | A1 * | 12/2005 | Lin | H01Q 3/08 | 343/882 |
| 2007/0177064 | A1 * | 8/2007 | Lin | H01Q 3/04 | 348/838 |
| 2012/0211632 | A1 * | 8/2012 | Yang | H01Q 1/1207 | 248/397 |
| 2014/0346294 | A1 * | 11/2014 | Lewry | H01Q 1/125 | 248/201 |
| 2015/0160537 | A1 * | 6/2015 | Bier | G03B 17/561 | 248/219.4 |
| 2017/0307134 | A1 * | 10/2017 | Padrin | F16B 5/125 | |
| 2021/0014987 | A1 * | 1/2021 | Moosburger | F16M 13/02 | |
| 2022/0263216 | A1 * | 8/2022 | Gardner | H02S 20/30 | |
| 2023/0178874 | A1 * | 6/2023 | Kim | F16C 11/045 | 343/702 |
| 2024/0113419 | A1 * | 4/2024 | Li | H01Q 1/246 | |

* cited by examiner

BRACKET ASSEMBLY

CROSS-REFERENCE TO RELATED PATENT APPLICATION

This application claims the benefit of priority to Taiwan Patent Application No. 113129293, filed on Aug. 6, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

This disclosure relates to a bracket assembly, particularly to a bracket assembly suitable for antenna installation.

BACKGROUND OF THE DISCLOSURE

The installation position of an antenna has a significant impact on signal transmission stability. For example, a dish antenna will first adjust its angle and position when communicating with satellites or base stations, searching and scanning for signals from local base stations or satellites to optimize signal strength and communication quality.

Due to the mechanism design of existing dish antennas, their installation locations are often limited. In other words, existing dish antennas are often limited to being installed in fixed external environments, such as being fixed to a wall or mounted on a pole. These installation environment restrictions are disadvantageous to the adjustment of the antenna's angle, thereby affecting signal strength and communication quality during communication.

SUMMARY OF THE DISCLOSURE

The technical problem that this disclosure aims to solve is to provide a bracket assembly capable of being installed in different environments and having an elevation adjustment functionality, addressing the deficiencies of prior art.

To solve the above technical problem, one of the technical solutions adopted by this disclosure is to provide a bracket assembly that includes a first bracket and a second bracket. The first bracket comprises a mounting base and two side connecting plates, with the two side connecting plates respectively connected to the two sides of the mounting base. The mounting base has a mounting surface, and the mounting surface has a cross-shaped groove. The second bracket is pivotally connected to the first bracket, and the second bracket is located on the opposite side of the mounting surface. The second bracket includes a supporting base, an extension portion, and two wing portions. The extension portion is connected to one side of the supporting base, and the two wing portions are connected to the extension portion and extending in the same direction. A first limiting gap is formed on the extension portion between the two wing portions.

One of the beneficial effects of the present disclosure is that the provided bracket assembly can utilize the structural design of the cross-shaped groove on the mounting surface of the first bracket, allowing the bracket assembly to be installed in different environments, such as horizontal bars, vertical bars, walls, and window sills. Moreover, the transceiver device mounted on the second bracket can rotate relative to the first bracket through the pivotal connection design between the second bracket and the first bracket. Accordingly, the transceiver device can change its elevation angle, thereby adjusting signal strength and communication quality to optimal condition.

For a further understanding of the features and technical content of this disclosure, please refer to the following detailed description and drawings. However, the provided drawings are only for reference and explanation, and are not intended to limit the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
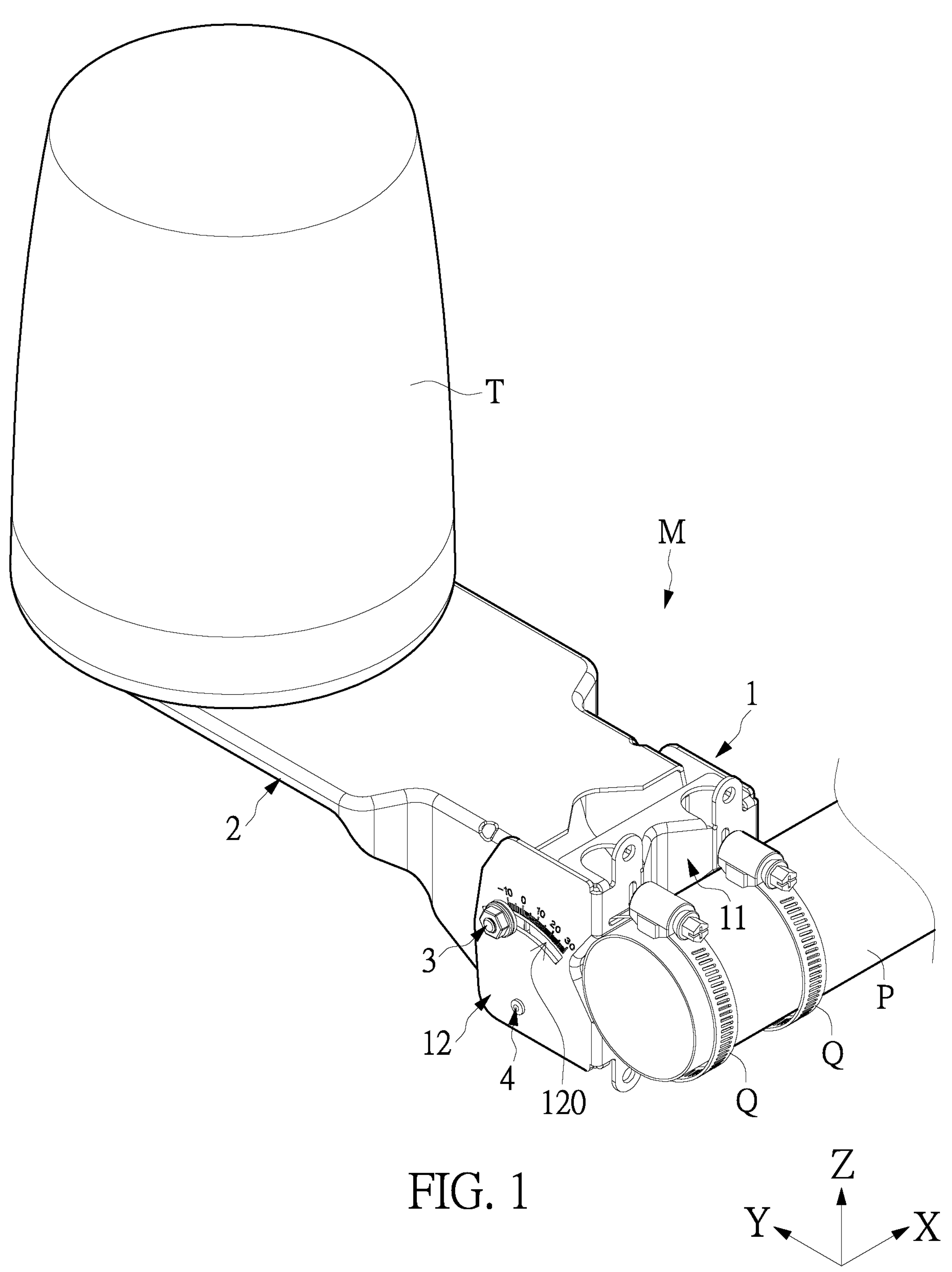
FIG. 1 is a schematic view of the transceiver device and bracket assembly according to the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Refer to FIG. 1, which is a schematic view of the transceiver device and bracket assembly according to the first embodiment of the present disclosure. The first embodiment of the present disclosure provides a bracket assembly M, which includes a first bracket 1 and a second bracket 2. The second bracket 2 is pivotally connected to the first bracket 1, and the second bracket 2 is used for mounting a transceiver device. In the present disclosure, the transceiver device only shows its housing T for exemplary illustrations, and the specific form of the transceiver device is not limited thereto.

Figure 2:
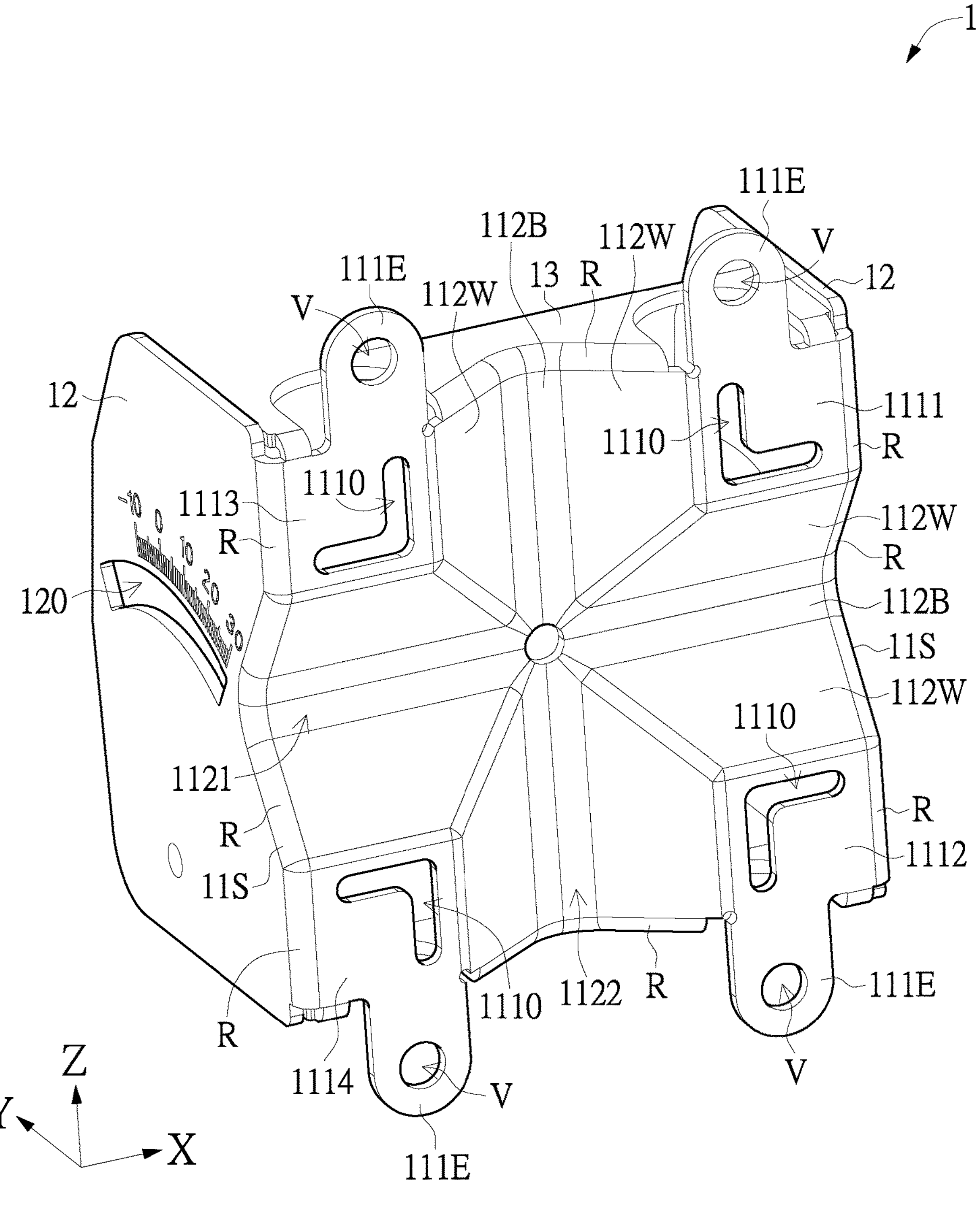
FIG. 2 is a first schematic view of the first bracket of the bracket assembly according to the present disclosure.
Figure 3:
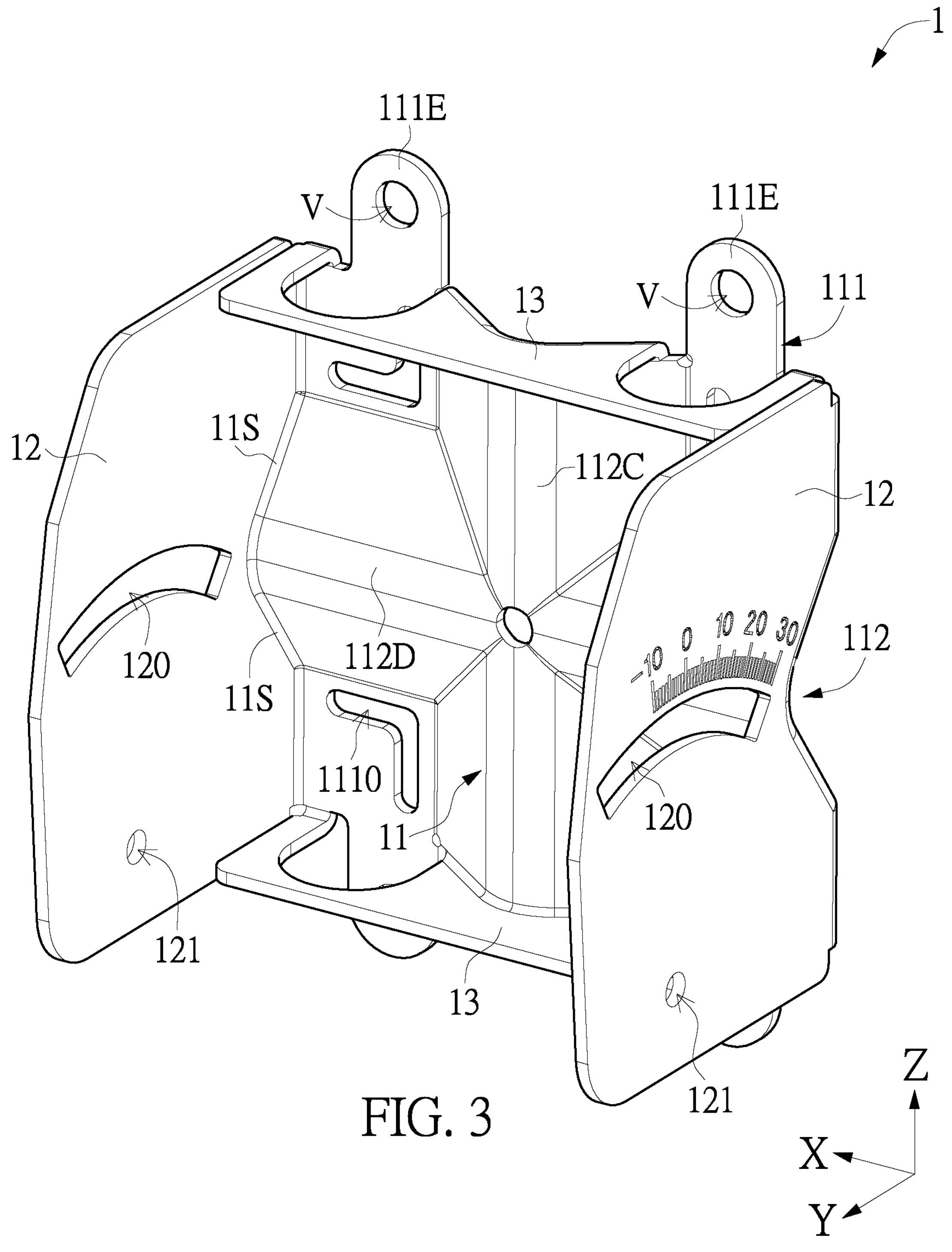
FIG. 3 is a second schematic view of the first bracket of the bracket assembly according to the present disclosure.

Refer to FIG. 2 and FIG. 3, which are schematic views of the first bracket of the bracket assembly according to the present disclosure. The first bracket 1 includes a mounting base 11 and two side connecting plates 12. The two side connecting plates 12 are respectively connected to the two sides 11S of the mounting base 11. The mounting base 11 has a mounting surface 111, and the mounting surface 111 has a cross-shaped groove 112. The cross-shaped groove 112 is composed of a transverse groove 1121 and a longitudinal groove 1122 intersecting each other.

The mounting surface 111 is divided into four mounting areas 1111, 1112, 1113, 1114 by the cross-shaped groove 112. Each of the four mounting areas 1111~1114 has an L-shaped slot 1110, and a rounded structure R is formed at the junction of each mounting area 1111~1114 with the adjacent side connecting plates 12 (i.e., the two sides 11S); furthermore, a rounded structure R is also formed at the junction of the transverse groove 1121 in the cross-shaped groove 112 with the two side connecting plates 12. Additionally, the first bracket 1 further includes two additional side plates 13 respectively connected to the upper and lower sides of the mounting base 11, and a rounded structure R is also formed at the junction of the longitudinal groove 1122 in the cross-shaped groove 112 with the two side plates 13. The rounded structure R can further enhance the structural strength of the first bracket 1. However, the present disclosure is not limited thereto. In another embodiment, a notch structure can be formed at the junction of the cross-shaped groove 112 with the two side plates 13 (i.e., not connected together).

Each mounting area 1111~1114 has an ear 111E, each ear 111E has a fixing hole V. The four ears 111E in the mounting areas 1111~1114 extend in the Z-axis direction and are coplanar with the mounting surface 111, providing the advantages of easy installation and reduced size. Additionally, each side connecting plate 12 respectively has an elevation adjustment slot 120, wherein the elevation adjustment slot 12 is arc-shaped. An angle scale is displayed along the upper edge of the elevation adjustment slot 120 on the side connecting plate 12. Furthermore, each side connecting plate 12 respectively has a first connection hole 121, wherein the first connection hole 121 is located below the elevation adjustment slot 120.

Figure 4:
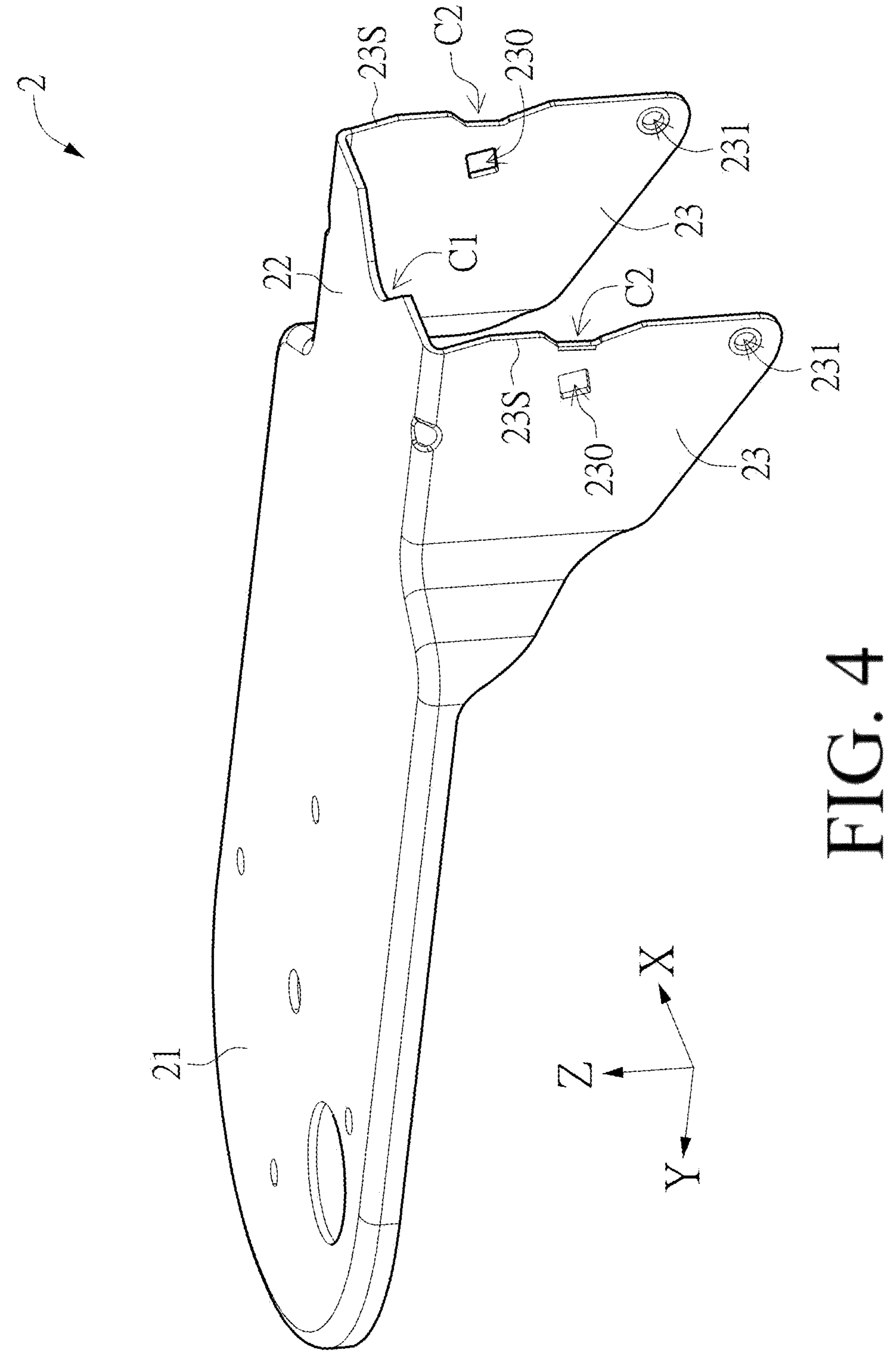
FIG. 4 is a schematic view of the second bracket of the bracket assembly according to the present disclosure.

Refer to FIG. 4, which is a schematic view of the second bracket of the bracket assembly according to the present disclosure. The second bracket 2 includes a supporting base 21, an extension portion 22, and two wing portions 23. The extension portion 22 is connected to one side of the supporting base 21, while the two wing portions 23 are connected to the extension portion 22 and extend in the same direction. A first limiting gap C1 is formed between the two wing portions 23 on the extension portion 22. Additionally, each wing portion 23 has a through hole 230, and a second limiting gap C2 is formed at a position near the through hole 230 on a side edge of the wing portion 23. Each wing portion 23 also has a second connection hole 231, wherein the second connection hole 231 is located below the through hole 230 and near the end of the wing portion 23.

Figure 5:
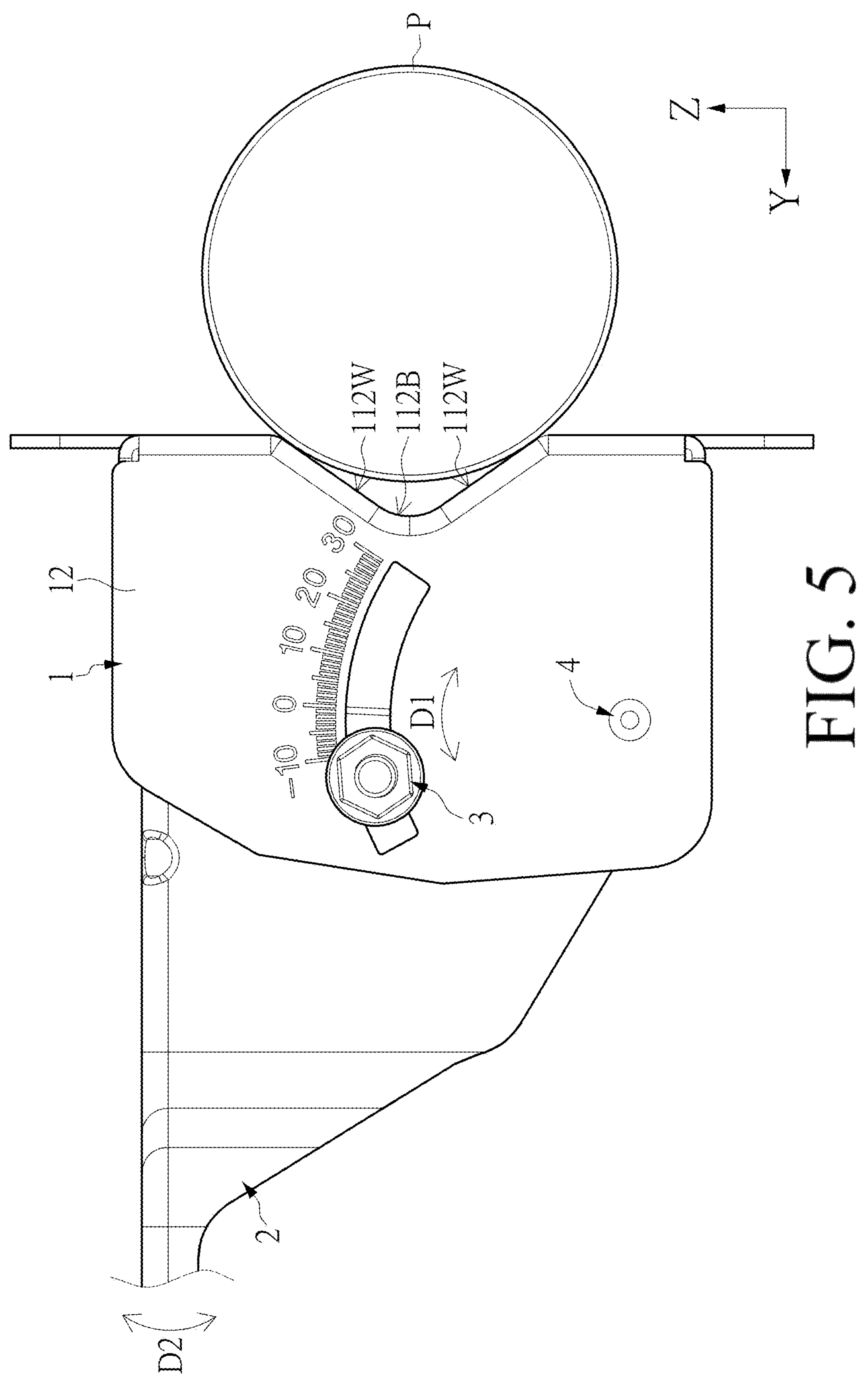
FIG. 5 is a side view schematic view of the bracket assembly according to the first embodiment of the present disclosure.

Refer to FIG. 3 to FIG. 5. FIG. 5 is a side view schematic view of the bracket assembly according to the first embodiment of the present disclosure. The bracket assembly M further includes two fasteners 3 and two connectors 4. When the second bracket 2 is pivotally connected to the first bracket 1, the second bracket 2 is located on the opposite side of the mounting surface 111. The two through holes 230 respectively correspond to the two elevation adjustment slots 120, and the two first connection holes 121 respectively correspond to the two second connection holes 231. Each fastener 3 passes through the corresponding through hole 230 and elevation adjustment slot 120, and each connector 4 passes through the corresponding first connection hole 121 and second connection hole 231.

For example, the fastener 3 can be a screw, and the connector 4 can be a fixing pin, but the present disclosure is not limited thereto. Accordingly, the second bracket 2 can pivot relative to the first bracket 1 using the connector 4 as an axis. Additionally, as shown in FIG. 1, when adjusting the elevation angle of the transceiver device (the housing T in FIG. 1), the elevation adjustment slot 120 can be used as a track, allowing the fastener 3 to move along the elevation adjustment slot 120 (direction D1 in FIG. 5), driving the second bracket 2 to pivot (direction D2 in FIG. 5), thereby achieving the purpose of adjusting the elevation angle of the transceiver device. Once confirming that the transceiver device is adjusted to the desired elevation angle, the second bracket 2 is then locked and fixed.

Continue referring to FIG. 1 and FIG. 5. In the first embodiment, the transceiver device (the housing T in FIG. 1) can be installed on a pipe P through the first bracket 1. The pipe P is cylindrical and horizontally (parallel to the X-axis direction) configured. During installation, the mounting surface 111 of the first bracket 1 faces the pipe P, and the pipe P is disposed in the transverse groove 1121 of the cross-shaped groove 112. As shown in FIG. 5, the transverse groove 1121 and the longitudinal groove 1122 in the cross-shaped groove 112 each include a groove bottom 112B and two groove walls 112W connected to the groove bottom 112B. The surface of the groove bottom 112B is concave, and the surfaces of the groove walls 112W are inclined surfaces.

Accordingly, the contour design of the groove bottom 112B and the groove walls 112W correspond to the shape of the pipe P. The concave contour of the groove bottom 112B can be circular shaped, and the surface contour of the groove walls 112W can be tangent to the circle. Thus, the cross-shaped groove 112 of the present disclosure can accommodate pipes P of different sizes through the design of the groove bottom 112B and the groove walls 112W. For example, when the diameter of the pipe P is larger, the pipe P can be stably supported between the two groove walls 112W; when the diameter of the pipe P is smaller, the pipe P can directly abut the groove bottom 112B.

As shown in FIG. 1 and FIG. 2, the pipe P disposed in the transverse groove 1121 can be further fixed by two cable ties Q passing through the transverse hole portions of the four L-shaped slots 1110 (i.e., the portions of the L-shaped slot 1110 parallel to the X-axis direction) and surrounding the pipe P.

Figure 9:
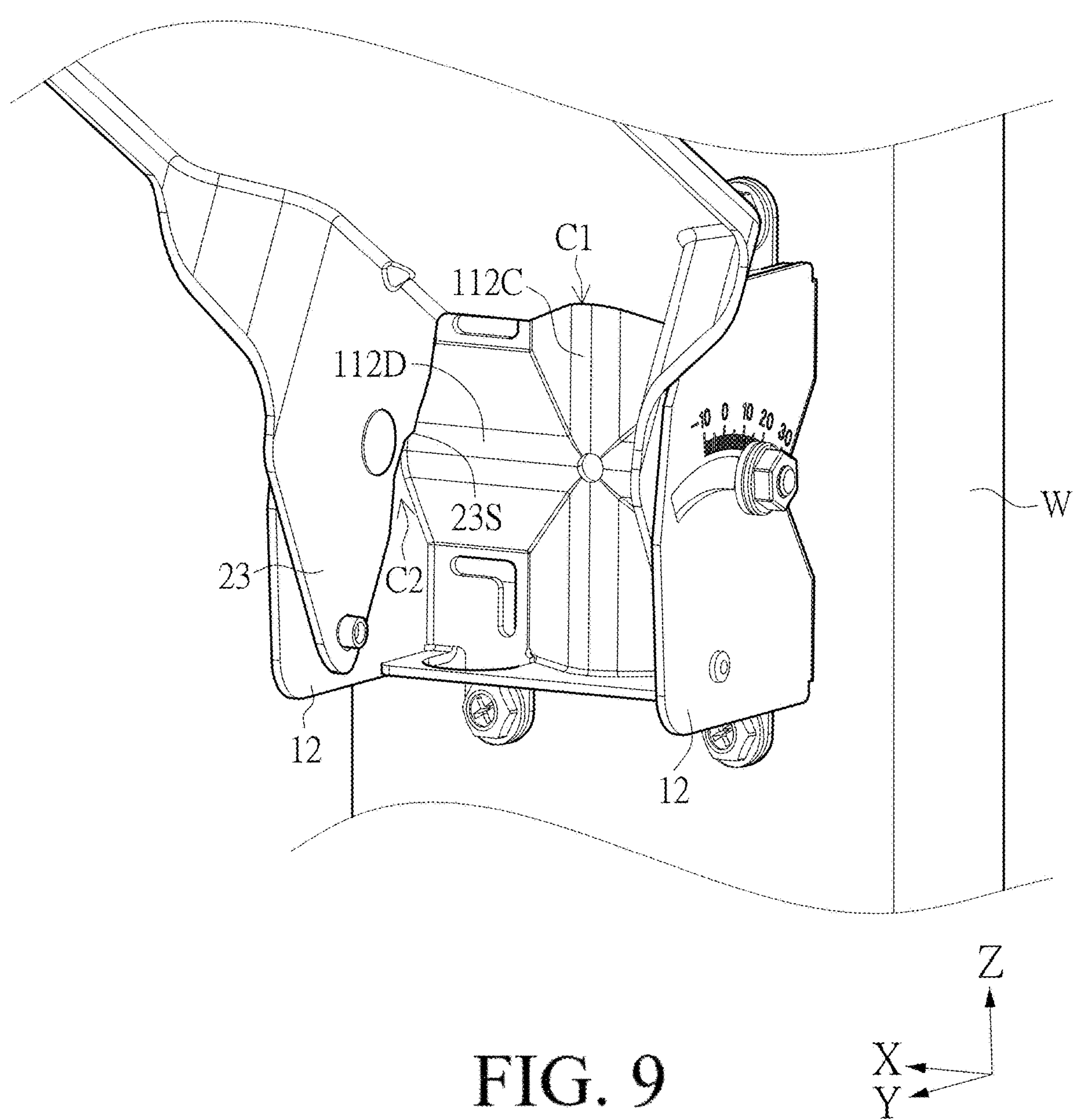
FIG. 9 is another usage schematic view of the transceiver device and bracket assembly according to the third embodiment of the present disclosure.

Additionally, refer to FIG. 3 and FIG. 4, together with FIG. 9. The second bracket 2 is located on the opposite side of the mounting surface 111, and the first bracket 1 has a bulged portion (i.e., longitudinal bulge 112C and transverse bulge 112D in FIG. 9) corresponding to the cross-shaped groove 112 on the opposite side of the mounting surface 111. Therefore, when adjusting the elevation angle through pivoting the first bracket 1 relative to the second bracket 2, in order to prevent interference of the second bracket 2 with the bulged portion on the opposite side of the first bracket 1 while pivoting, the present disclosure can utilize the design of the first limiting gap C1 and the second limiting gap C2 of the second bracket 2 to prevent such interference from happening. As shown in FIG. 9, the position of the first limiting gap C1 corresponds to the longitudinal bulge 112C, and the position of the second limiting gap C2 corresponds to the transverse bulge 112D. Thus, when the second bracket 2 pivots, it can avoid the bulged portions through the design of the first limiting gap C1 and the second limiting gap C2, thereby achieving the effect of preventing interference.

Second Embodiment

Figure 6:
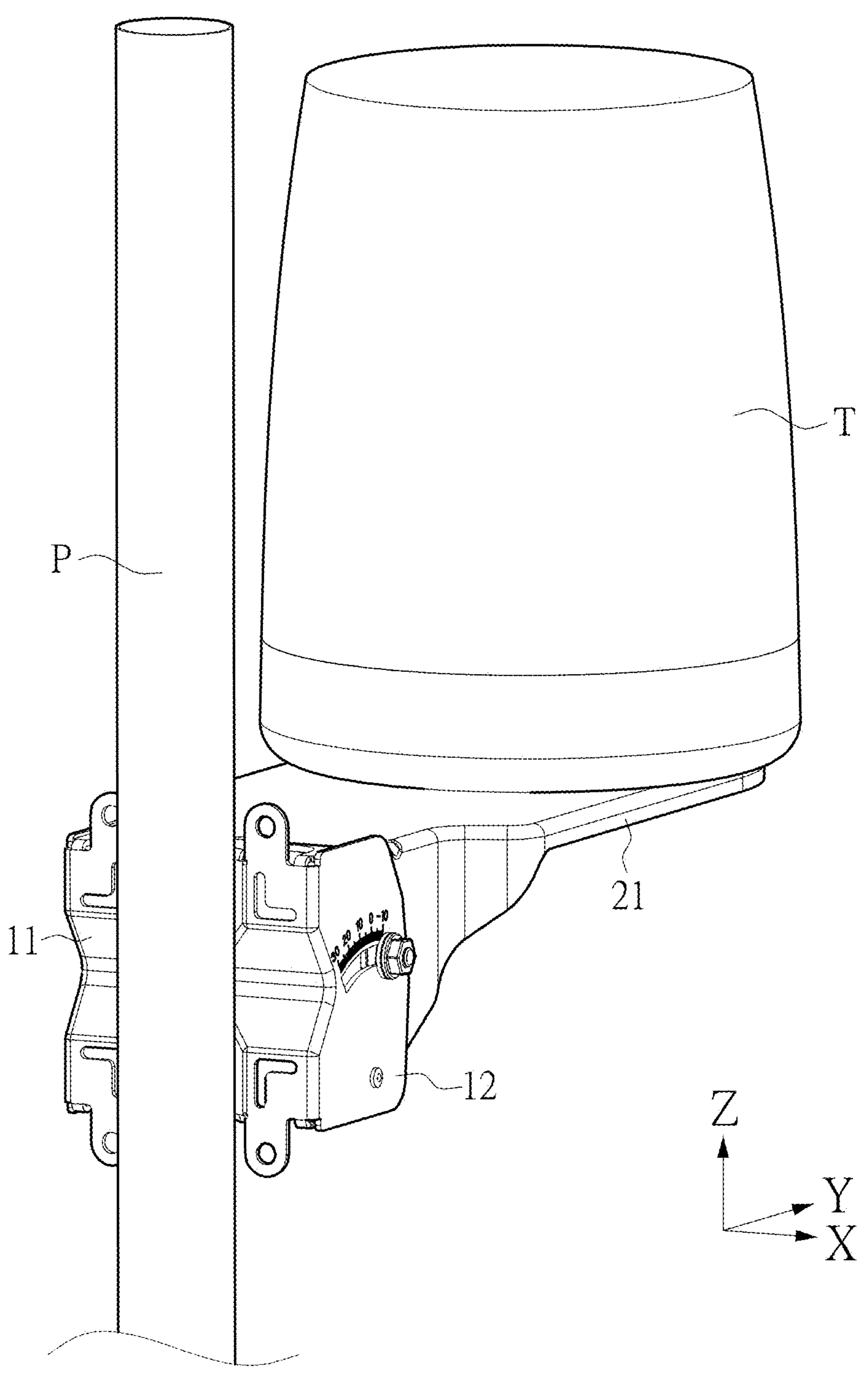
FIG. 6 is a schematic view of the transceiver device and bracket assembly according to the second embodiment of the present disclosure.

Refer to FIG. 6, which is a schematic view of the transceiver device and bracket assembly according to the second embodiment of the present disclosure. It should be noted that in all embodiments of the present disclosure, the structure of the bracket assembly M (including the first bracket 1 and the second bracket 2) is the same, as shown in FIG. 2 to FIG. 4. Therefore, the structure of the first bracket 1 and the second bracket 2 will not be repeated herein. The different embodiments of the present disclosure are mainly used to indicate that the bracket assembly M can be installed in different environments. For example, in FIG. 6, the bracket assembly M can be installed on a vertically configured pipe P.

As shown in FIG. 2 and FIG. 6, the vertically configured pipe P is disposed in the longitudinal groove 1122 of the cross-shaped groove 112, and the pipe P is stabilized through the structural design of the groove bottom 112B and the two groove walls 112W of the longitudinal groove 1122, preventing it from shaking in the groove and affecting the reception quality of the transceiver device (see the housing T of the transceiver device in FIG. 6). Similarly, the pipe P disposed in the longitudinal groove 1122 can be further fixed by two cable ties (not shown in FIG. 6) passing through the longitudinal hole portions of the four L-shaped slots 1110 (i.e., the portions of the L-shaped slot 1110 parallel to the Z-axis direction) and surrounding the pipe P.

Third Embodiment

Figure 7:
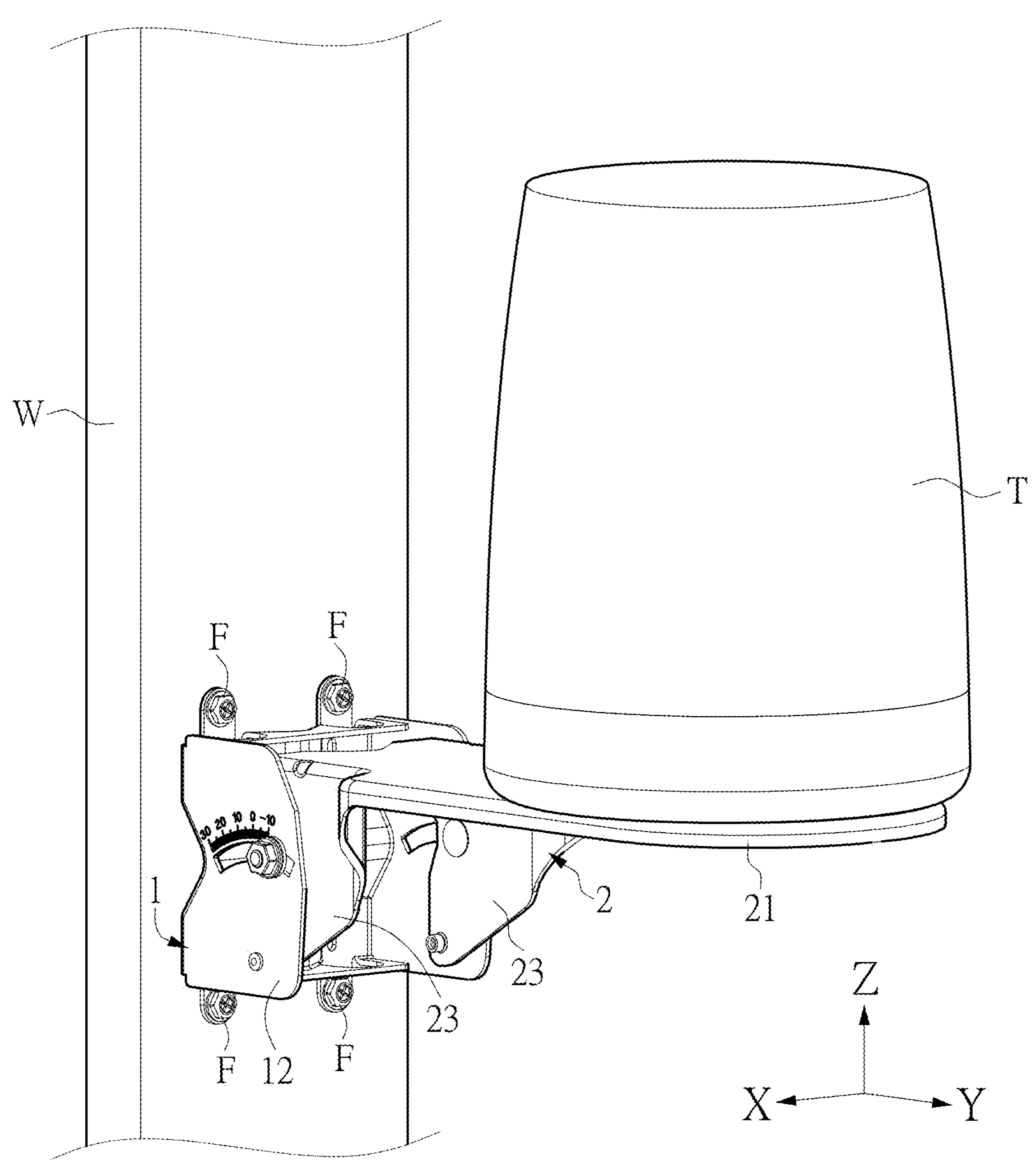
FIG. 7 is a schematic view of the transceiver device and bracket assembly according to the third embodiment of the present disclosure.

Refer to FIG. 7, which is a schematic view of the transceiver device and bracket assembly according to the third embodiment of the present disclosure. In FIG. 7, the bracket assembly M of the present disclosure can be installed on a wall W. As shown in FIG. 2 and FIG. 7, the mounting surface 111 (including four mounting areas 1111~1114) of the first bracket 1 abuts against the wall W, and the ears 111E of the four mounting areas 1111~1114 also abut against the wall W (since the ears 111E are coplanar with the mounting surface 111). Then, the first bracket 1 is fixed to the wall W by four screws F respectively passing through four fixing holes V.

Figure 8:
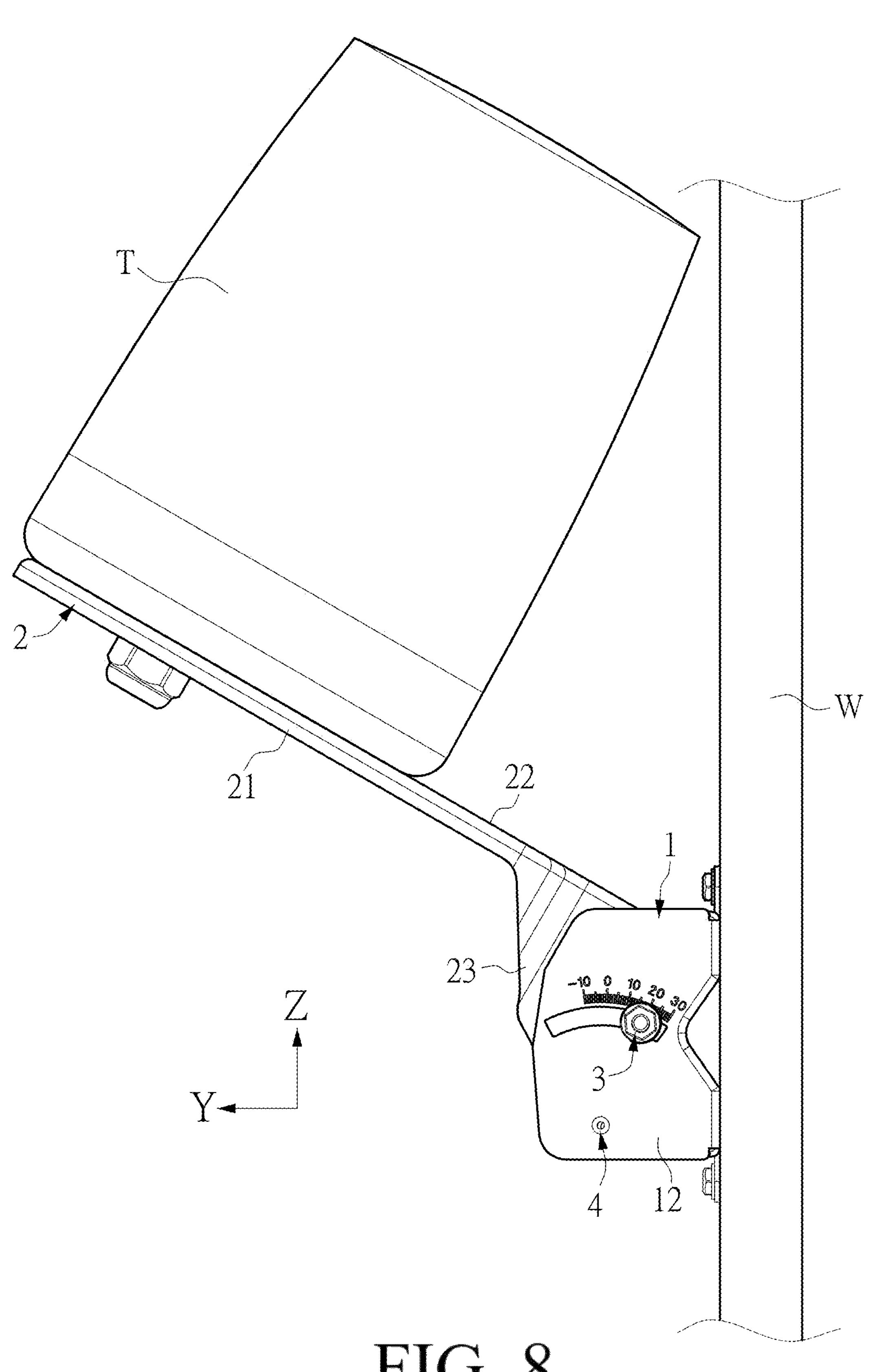
FIG. 8 is a usage schematic view of the transceiver device and bracket assembly according to the third embodiment of the present disclosure.

Refer to FIG. 8 and FIG. 9. FIG. 8 is a usage schematic view of the transceiver device and bracket assembly according to the third embodiment of the present disclosure, and FIG. 9 is another usage schematic view of the transceiver device and bracket assembly according to the third embodiment of the present disclosure. Since the first limiting gap C1 and the second limiting gap C2 respectively correspond to the longitudinal bulge 112C and the transverse bulge 112D, the second bracket 2 can avoid the bulged portions through the design of the first limiting gap C1 and the second limiting gap C2 when pivoting relative to the first bracket 1, thereby preventing interference from happening. However, on the other hand, when the height of the wall W is high, the transceiver device (the housing T of the transceiver device in FIG. 8) might collide with the wall W when adjusting the elevation angle if the pivot angle of the second bracket 2 is too large. Therefore, the present disclosure can further limit the maximum pivot angle of the second bracket 2 by appropriately adjusting the gap size of the second limiting gap C2. For example, the smaller the gap size of the second limiting gap C2, the more difficult it is for the second bracket 2 to avoid the portion of transverse bulge 112D (i.e., the second bracket 2 is more likely to abut against the transverse bulge 112D when pivoting), thereby reducing the maximum pivot angle of the second bracket 2. In other words, the present disclosure can limit the maximum pivot angle of the second bracket 2 by reducing the gap size of the second limiting gap C2, so that when adjusting the elevation angle of the transceiver device, the second bracket 2 will abut against the transverse bulge 112D before the transceiver device collides with the wall W, thus preventing the transceiver device from colliding with the wall W.

Fourth Embodiment

Figure 10:
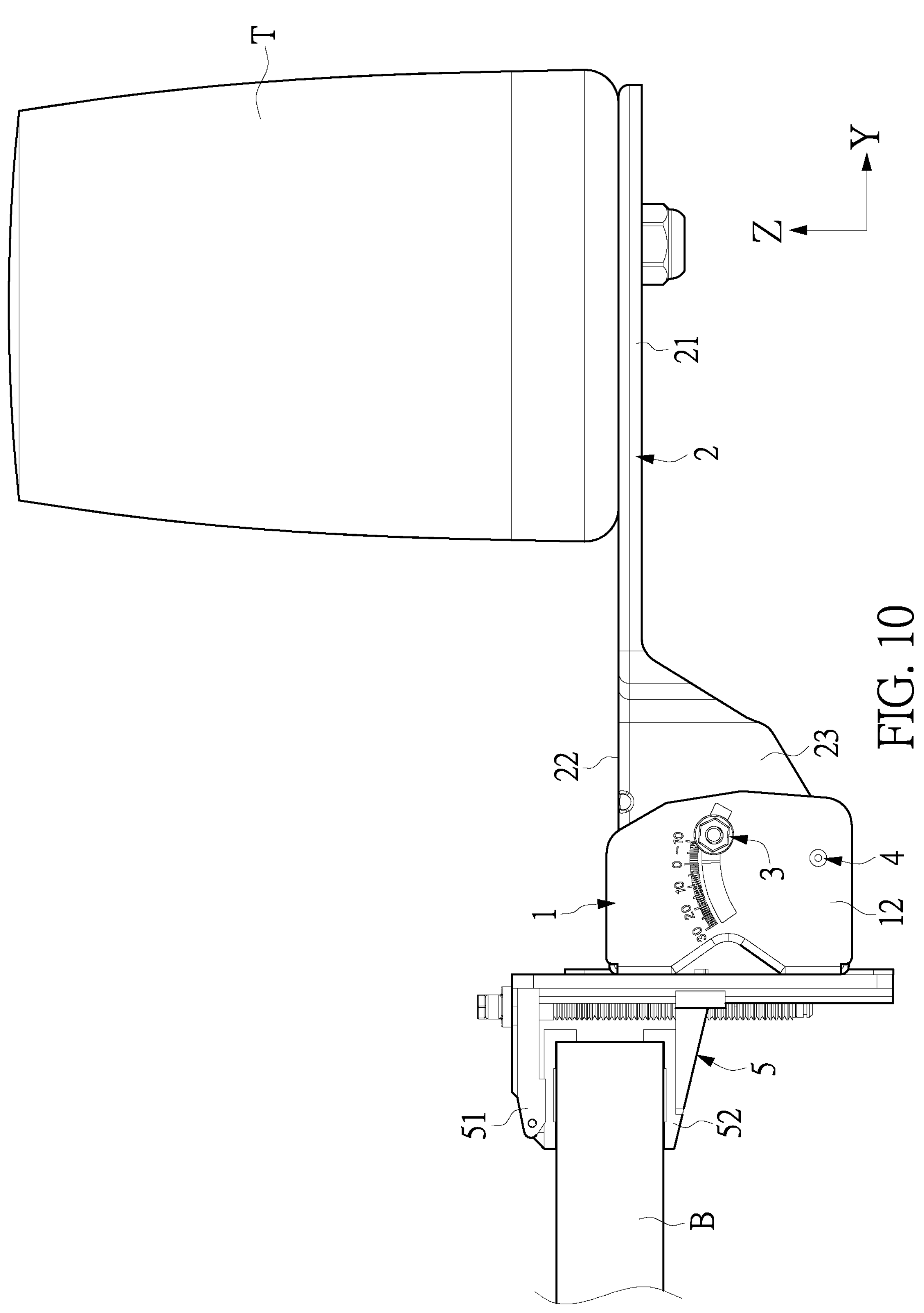
FIG. 10 is a schematic view of the transceiver device and bracket assembly according to the fourth embodiment of the present disclosure.

Refer to FIG. 10, which is a schematic view of the transceiver device and bracket assembly according to the fourth embodiment of the present disclosure. In FIG. 10, the bracket assembly M of the present disclosure can be installed on a protrusion B of a window edge. Specifically, as shown in FIG. 2 and FIG. 10, the bracket assembly M further includes a clamp structure 5. The first bracket 1 is fixed to the clamp structure 5 via multiple locking components (not shown in FIG. 10) respectively passing through multiple fixing holes V. The clamp structure 5 includes a first fixing component 51 and a second fixing component 52. The first fixing component 51 and the second fixing component 52 respectively clamp the protrusion B from above and below and then are locked tightly to achieve a fixing effect.

Beneficial Effects of the Embodiments

The bracket assembly M provided by the present disclosure can utilize the structural design of the cross-shaped groove 112 on the mounting surface 111 of the first bracket 1, allowing the bracket assembly M to be installed in different environments, such as horizontal bars, vertical bars, walls, and window sills. Moreover, the transceiver device mounted on the second bracket 2 can rotate relative to the first bracket 1 through the pivotal connection design between the second bracket 2 and the first bracket 1. Accordingly, the transceiver device can change its elevation angle, thereby adjusting signal strength and communication quality to optimal condition.

Furthermore, when the bracket assembly M is installed on the pipe P, the pipe P can be disposed in the cross-shaped groove 112, and the pipe P can be stabilized through the structural design of the groove bottom 112B and the two groove walls 112W, preventing it from shaking in the groove and affecting the reception quality of the transceiver device (see the housing T of the transceiver device in FIG. 6).

Additionally, when the transceiver device adjusts its elevation angle by pivoting the first bracket 1 relative to the second bracket 2, to prevent interference of the second bracket 2 with the bulged portion (longitudinal bulge 112C and transverse bulge 112D) on the opposite side of the first bracket 1 while pivoting, the present disclosure can utilize the first limiting gap C1 and the second limiting gap C2 of the second bracket 2 respectively corresponding to the longitudinal bulge 112C and the transverse bulge 112D, thereby preventing interference from happening.

On the other hand, although the structural design of the first limiting gap C1 and the second limiting gap C2 of the second bracket 2 can prevent interference from happening, it may also result in the pivot angle of the second bracket 2 to become too large, thereby causing the transceiver device to accidentally collide with external objects, such as the wall W, when adjusting the elevation angle. Therefore, to avoid such collisions, the present disclosure can further limit the maximum pivot angle of the second bracket 2 by appropriately adjusting the gap size of the second limiting gap C2, for example, by reducing the gap size of the second limiting gap C2. When the transceiver is adjusting the elevation angle, the second bracket 2 will first abut against the transverse bulge 112D before the transceiver collides with the wall W, thus preventing the transceiver from colliding with the wall W.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A bracket assembly, comprising:

a first bracket, including a mounting base and two side connecting plates, the two side connecting plates being respectively connected to the two sides of the mounting base, the mounting base having a mounting surface, the mounting surface having a cross-shaped groove, the first bracket having a longitudinal bulge and a transverse bulge corresponding to the cross-shaped groove on the opposite side of the mounting surface; and a second bracket pivotally connected to the first bracket, the second bracket being located on an opposite side of the mounting surface, the second bracket including a supporting base, an extension portion, and two wing portions, the extension portion being connected to one side of the supporting base, the two wing portions being connected to the extension portion and extending in a same direction, the extension portion having a first limiting gap formed between the two wing portions;

wherein, when the second bracket is pivoted relative to the first bracket, the longitudinal bulge is disposed in the first limiting gap to prevent the second bracket from being interfered with by the longitudinal bulge.

2. The bracket assembly according to claim 1, wherein the two side connecting plates respectively have two elevation adjustment slots, and each of the elevation adjustment slots is arc-shaped.

3. The bracket assembly according to claim 2, further comprising two fasteners, the two wing portions respectively having two through holes corresponding to the two elevation adjustment slots; wherein, when the second bracket is pivotally connected to the first bracket, one of the fasteners is configured for passing through one of the through holes and a corresponding one of the two elevation adjustment slots.

4. The bracket assembly according to claim 1, wherein each of the wing portions has a through hole, and a second limiting gap is formed at a position near the through hole on a side edge of the wing portion.

5. The bracket assembly according to claim 1, wherein the cross-shaped groove includes a groove bottom and two groove walls connected to both sides of the groove bottom, a surface of the groove bottom is concave, and a surface of the groove walls is flat.

6. The bracket assembly according to claim 1, wherein the mounting surface is divided into four mounting areas by the cross-shaped groove, each of the mounting areas has an L-shaped slot, and a rounded structure is formed at a junction of each of the mounting areas and the adjacent side connecting plate.

7. The bracket assembly according to claim 1, wherein the mounting surface is divided into multiple mounting areas by the cross-shaped groove, each mounting area has an ear, and the ear has a fixing hole.

8. The bracket assembly according to claim 7, further comprising a clamp structure, and the first bracket is fixed to the clamp structure through a plurality of locking components respectively passing through a plurality of the fixing holes.

9. The bracket assembly according to claim 7, wherein each of the ears is coplanar with the mounting surface.

10. The bracket assembly according to claim 1, wherein a rounded structure is formed at a junction of the cross-shaped groove and the two side connecting plates.

* * * * *